United States Patent
Mark

(10) Patent No.: US 11,514,807 B2
(45) Date of Patent: Nov. 29, 2022

(54) METHOD AND APPARATUS FOR ASSISTING PERSONS WITH DISABILITIES

(71) Applicant: Gregory P. Mark, Indianapolis, IN (US)

(72) Inventor: Gregory P. Mark, Indianapolis, IN (US)

( * ) Notice: Subject to any disclaimer, the term of this patent is extended or adjusted under 35 U.S.C. 154(b) by 634 days.

(21) Appl. No.: 15/928,907

(22) Filed: Mar. 22, 2018

(65) Prior Publication Data
US 2018/0277007 A1    Sep. 27, 2018

Related U.S. Application Data

(60) Provisional application No. 62/475,568, filed on Mar. 23, 2017.

(51) Int. Cl.
| | |
|---|---|
| G06F 9/451 | (2018.01) |
| G06F 3/04895 | (2022.01) |
| G09B 5/00 | (2006.01) |
| G09B 21/00 | (2006.01) |
| G09B 7/02 | (2006.01) |
| G06F 3/02 | (2006.01) |
| G06F 9/4401 | (2018.01) |
| G09B 13/00 | (2006.01) |
| G06F 3/0482 | (2013.01) |

(52) U.S. Cl.
CPC .................. *G09B 7/02* (2013.01); *G06F 3/02* (2013.01); *G06F 3/04895* (2013.01); *G06F 9/4411* (2013.01); *G06F 9/453* (2018.02); *G09B 13/00* (2013.01); *G06F 3/0482* (2013.01); *G09B 5/00* (2013.01); *G09B 21/001* (2013.01); *G09B 21/008* (2013.01)

(58) Field of Classification Search
CPC ................................ G09B 7/02; G06F 3/4895
USPC ................................................. 434/116, 362
See application file for complete search history.

(56) References Cited

U.S. PATENT DOCUMENTS

| | | | | |
|---|---|---|---|---|
| 4,637,797 | A * | 1/1987 | Whitney | G09B 19/0053 434/118 |
| 5,577,186 | A * | 11/1996 | Mann, II | G09B 5/065 715/203 |
| 6,219,047 | B1 * | 4/2001 | Bell | G06F 9/453 715/705 |
| 6,292,792 | B1 * | 9/2001 | Baffes | G06N 5/022 706/45 |
| 6,523,072 | B1 * | 2/2003 | Howarth | G06F 9/544 709/203 |
| 7,878,808 | B1 * | 2/2011 | Stumm | G09B 5/12 434/118 |
| 10,129,310 | B1 * | 11/2018 | Brunning | G06F 9/453 |

(Continued)

*Primary Examiner* — Robert P Bullington, Esq.
*Assistant Examiner* — Stephen Alvesteffer
(74) *Attorney, Agent, or Firm* — Alliance IP, LLC

(57) ABSTRACT

A computer aided instruction system includes a keyboard driver and an instruction renderer. The keyboard driver is configured to retrieve a keyboard input from a user before the application receives the keyboard input, and the instruction renderer is configured to execute a computer aided instruction tutorial to instruct the user to input a specific key or key combination. The keyboard driver is further configured to transmit the keyboard input to the instruction renderer to evaluate whether the one or more keystrokes matches the specific key or key combination.

11 Claims, 19 Drawing Sheets

(56) References Cited

U.S. PATENT DOCUMENTS

| | | | |
|---|---|---|---|
| 2003/0048311 A1* | 3/2003 | Wen .................... | G06F 3/04895 715/835 |
| 2003/0217287 A1* | 11/2003 | Kruglenko .............. | G06F 21/82 726/19 |
| 2005/0164153 A1* | 7/2005 | Beatty ...................... | G09B 7/04 434/350 |
| 2011/0029699 A1* | 2/2011 | Siegman ................. | G06F 3/023 710/38 |

* cited by examiner

METHOD AND APPARATUS FOR ASSISTING PERSONS WITH DISABILITIES

CROSS-REFERENCE TO RELATED APPLICATION

This application claims priority under 35 U.S.C. § 119(e) to U.S. Provisional Application No. 62/475,568 filed Mar. 23, 2017, which is expressly incorporated by reference herein.

BACKGROUND

Tutorial program may assist users or customers to use one or more applications, such as Microsoft Word, Microsoft Excel, Microsoft PowerPoint, Microsoft Outlook, Microsoft Internet Explorer or any other Windows application. However, the tutorial program typically does not interact with the application that a user wants to learn because the tutorial program typically does not run in the background behind the applications. As such, tutorials for the application may be executed separately from the application. For example, a tutorial may contain instructions that can be played on a digital recorder/player. The user may listen to the instructions by pressing a play button on the recorder, and after enough information has been played, the user may stop the instructions by pressing a stop button to follow the instruction on the application. However, due to a lack of any interaction between the tutorial program and the application, the tutorial program may not be able to provide any feedback to the user to notify whether the user has followed the instruction correctly.

SUMMARY

According to an aspect of the disclosure, a computer aided instruction system includes a keyboard driver and an instruction renderer. The keyboard driver is configured to retrieve a keyboard input from a user before the application receives the keyboard input, and the instruction renderer configured to execute a computer aided instruction tutorial to instruct the user to input a specific key or key combination. The keyboard driver is further configured to transmit the keyboard input to the instruction renderer to evaluate whether the one or more keystrokes matches the specific key or key combination.

In some embodiments, the computer aided instruction system may include a tutorial editor that is configured to create one or more computer aided instruction tutorials.

In some embodiments, the application may be an assistive technology.

In some embodiments, the instruction renderer may be configured to transmit the keyboard input to the application.

According to another aspect, one or more machine-readable media including a plurality of instructions stored thereon that in response to being executed by a computer aided instruction system, causes the computer aided instruction system to retrieve a keyboard input from a user before an application receives the input of the keyboard, wherein the keyboard input indicates a computer aided instruction tutorial, execute, in response to retrieving the keyboard input, the computer aided instruction tutorial to instruct the user to input a specific key or key combination, receive, in response to executing the computer aided instruction tutorial, one or more keystrokes from the user, and evaluate, in response to receiving the one or more keystrokes, whether the one or more keystrokes matches the specific key or key combination.

In some embodiments, the application may be an assistive technology.

In some embodiments, the computer aided instruction system may further to transmit, in response to evaluating the one or more keystrokes, the keyboard input to the application.

BRIEF DESCRIPTION OF THE DRAWINGS

The detailed description particularly refers to the following figures, in which.

DETAILED DESCRIPTION OF THE DRAWINGS

Figure 1:
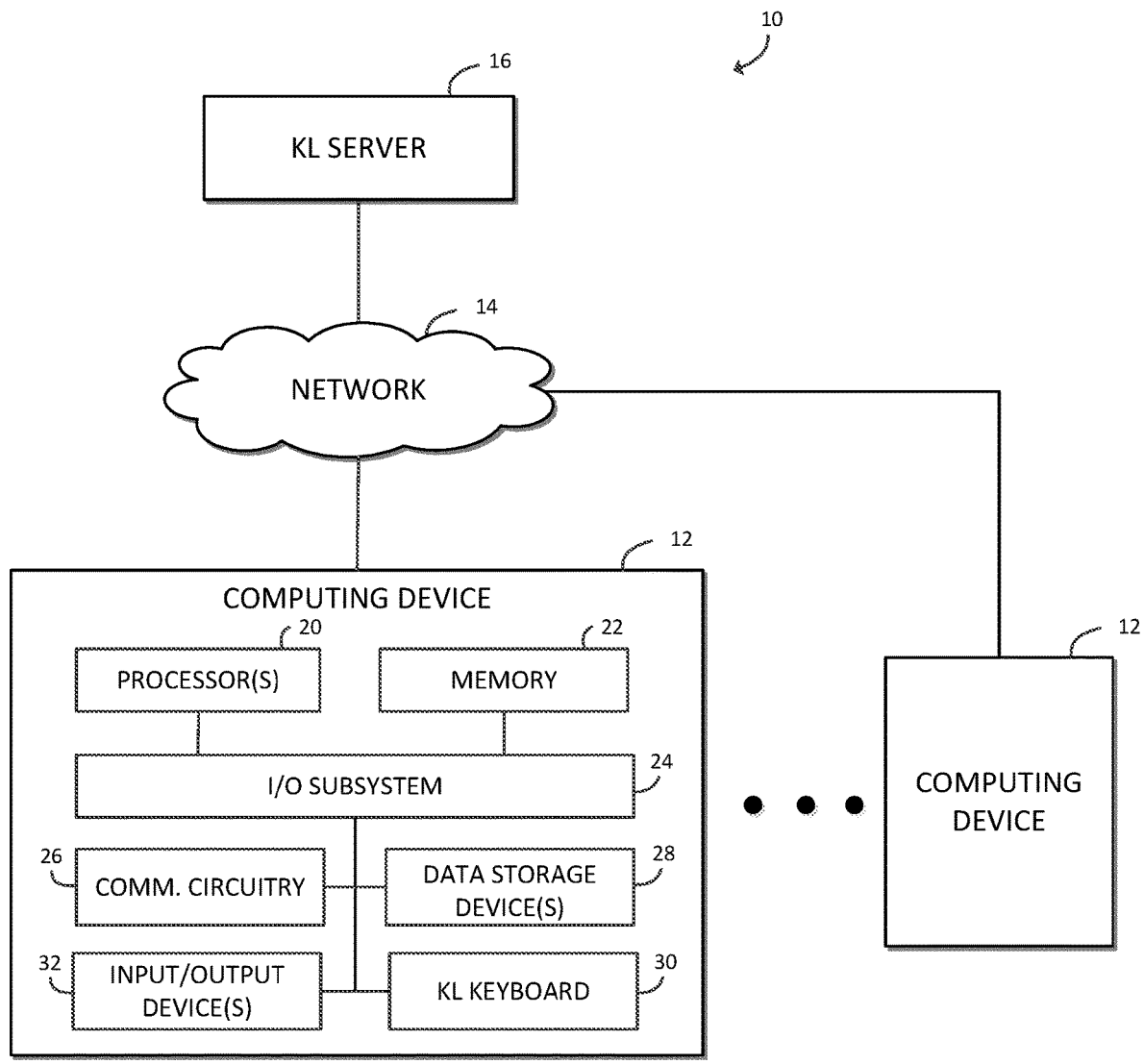
FIG. 1 illustrates a simplified block diagram of a computer aided instruction system.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the illustrative embodiment, KL Courseware (Keyboard Library Courseware) is a computer based training (CBT) e-learning program, also known as computer aided instruction (CAI), that was developed to automate training processes for users. It should be appreciated that at least some of the CBT e-learning programs are intended for teaching blind, visually impaired, and/or learning disabled individuals to use computers with assistive technologies. For example, the assistive technologies include a screen magnifier, a screen reader, and a braille display that assist users to read computer screens. Specifically, the screen magnifier is configured to enlarge texts on a display monitor to assist visually impaired users. ZoomText and Magic are examples of screen magnification programs. The screen reader is configured to convert text-to-speech to read aloud texts shown on a display monitor. The screen reader may read aloud texts or menu choices shown on display monitor, a line of texts specified by a user, or each character as it is being typed on a computer keyboard. An exemplary screen reader program for Microsoft Windows is called Job Access With Speech (JAWS) for Window. The braille display is configured to generate text output as braille characters. Additionally, the braille display may include a braille keyboard that the users can use to input data. The Focus 40 Blue is an example of braille display. However, it should be appreciated that KL Courseware may be used by non-disabled users for learning how to use application software using a keyboard (e.g., shortcuts and hotkeys).

KL Courseware is configured to teach users how to operate one or more assistive technologies and computer productivity software without an on-site human teacher. In place of an on-site human teacher, KL Courseware includes tutorials containing human made digital recordings of how to perform specific computer tasks. It should be appreciated that, in some embodiments, the tutorials may include machine made digital recordings of how to perform specific computer tasks.

For example, KL Courseware may be setup to instruct the user how to operate Microsoft Word, Microsoft Excel, Microsoft PowerPoint, Microsoft Outlook, Microsoft Internet Explorer or any other Windows application. However, it should be appreciated that, in some embodiments, KL Courseware may run on various different operating systems (e.g., macOS, linux, iOS, and android) and/or executed on a web-based platform. In some embodiments, KL Courseware may run with employer proprietary software for teaching the users how to use programs in job settings. For example, a common proprietary software environment where the users are often employed is the customer service representative field. The Internal Revenue Service is one example of a customer service representative job where many blind and visually impaired persons are employed.

In the illustrative embodiment, KL Courseware includes a KL Driver, a KL editor, and a KL agent. Typically, an operating system (e.g., Windows) includes multiple drivers, each of which is configured to operate or control a particular type of device that is coupled to a computer. KL Driver is a keyboard driver that was specifically developed to work with KL Courseware to receive user keyboard inputs. It should be appreciated that, when KL Driver is installed on a computer, KL Driver may supersede a standard Windows keyboard driver that is already installed on that computer. In other words, KL Driver may retrieve a keyboard input from a user before the assistive technologies or application software (such as MS Office) receive the user input such that the user input may be evaluated by KL Agent. If KL Agent determines that the user input includes a correct key or a correct key combination, KL Agent may transmit the user input to an applicable assistive technology or application software (such as Microsoft Word) so that the applicable program software may perform the command. Like the standard keyboard driver, which comes with the Windows operating system, KL Driver is transparent to the user as the user interacts with the computer. Microsoft Code signing certification may be used to authenticate the driver. It should be appreciated that KL Driver may support wireless and/or wired keyboards. Additionally, in some embodiments, KL Driver may disable a moues function to mandate the user to use the keystrokes.

In the illustrative embodiment, KL Editor is an authoring tool that is used to create the computer aided instruction (CAI) tutorials. Typically, KL Editor is not provided to the users. Instead, KL Editor is used by developers to create CAI tutorials or lessons which are sold as part of a KL Courseware package to the users. The users may choose to purchase a KL Courseware package per application software. Alternatively, the users may choose to purchase a bundle that includes multiple application software. KL Editor is used to build lesson structures containing menus, submenus, and skill sets for one or more program software and stores the CAI tutorials or lessons in one or more lesson files. In the illustrative embodiment, the lesson file has a .kst extension (FILENAME.kst). The characters contained in FILENAME may be substituted with the characters that the developer decides to name the file. When the user opens a desired tutorial or lesson from KL Courseware, KL Agent retrieves the associated lesson file and displays menus, submenus, sound clips and skills sets stored in the lesson file for the user to select a skill set the user desires to learn. It should be appreciated that each skill set is associated with a particular function or feature of an assistive technology and/or application software that the user wishes to learn. For example, the skill set may be how to change a font style on Microsoft Word, how to skip to a next page of a PDF document on Adobe Reader, or how to command JAWS to read a paragraph aloud on Internet Explore. KL Agent receives and processes the user input while the user interacts with KL Agent to learn how to use the applicable assistive technology and/or application software. It should be appreciated that KL Editor may allow the developer to block certain keys or key combinations. This is especially useful when the user is prompted to type text using only alpha-numeric, punctuation, and a command key combination. It should be appreciated that, in some embodiments, KL Editor may be provided to a user who purchased KL Courseware to allow the purchaser (e.g., a company) to create a CAI tutorial or lesson tailored to the purchaser's need to train trainees.

In the illustrative embodiment, the lesson files may be generated by KL Editor to include one or more timers and controllers to manage flows of skill sets. For example, the lesson file may be designed such that KL Agent is configured to repeat the introductory sound clip associated with the selected skill set if KL Agent does not receive any user input within a predefined period of time. Additionally, in response to receiving a user input for a screen reader command, KL Agent may wait to play a next sound clip until after the screen reader completes its task.

Each skill set includes user notifications and key combinations the user need to type sequentially. The user notifications include sound clips that are recorded by a human. However, as discussed above, the sound clips may be generated by a machine. The user notifications include an introductory sound clip, which explains an application software feature associated with the selected skill set and a key combination associated with that feature for the user to type in order to perform or execute that feature. The other user notifications include sound clips that indicate whether the user has pressed a correct or wrong key combination.

Referring now to FIG. 1, in an illustrative embodiment, a computer aided instruction system 10 for executing KL Courseware includes a computing device 12 of a user, a network 14, and a KL server 16. In the illustrative embodiment, KL Editor is configured to be executed on KL server 106, while KL Driver and KL Agent are configured to be executed on the computing device 12. The computing device 12 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device.

In the illustrative embodiment, the computing device 12 includes one or more processors 20, a memory 22, an input/output ("I/O") subsystem 24, communication circuitry 26, one or more data storage devices 28, a KL keyboard 30, and input/output devices 32. It should be appreciated that the computing device 12 may include other or additional components, such as those commonly found in a typical computing device in other embodiments. The processor 20 may be embodied as any type of processor capable of performing the functions described herein. For example, the processor 20 may be embodied as a single or multi-core processor(s), digital signal processor, microcontroller, or other processor or processing/controlling circuit.

The memory 22 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM).

The memory 22 is communicatively coupled to the processor 20 via the I/O subsystem 24, which may be embodied as circuitry and/or components to facilitate input/output operations with the processor 20, the memory 22, and other components of the computing device 12. For example, the I/O subsystem 24 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 24 may form a portion of a system-on-a-chip (SoC) and be incorporated, along with one or more of the processor 20, the memory 22, and other components of the computing device 12, on a single integrated circuit chip.

The communication circuitry 26 may be embodied as any communication circuit, device, or collection thereof, capable of enabling communications between the computing device 12 and another computing device 12 or KL server 16. The communication circuitry 26 may be configured to use any one or more communication technology (e.g., wired or wireless communications) and associated protocols (e.g., Ethernet, Bluetooth®, Wi-Fi®, WiMAX, etc.) to effect such communication.

The data storage 28 may be embodied as any type of device or devices configured for short-term or long-term storage of data such as, for example, memory devices and circuits, memory cards, hard disk drives, solid-state drives, or other data storage devices. In the illustrative embodiment, the data storage 28 may be configured to store one or more lesson files obtained from KL server 106 as discussed in above.

The computing device 12 and KL server 106 of the computer aided instruction system 10 are illustratively in communication via the network 14, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 2A:
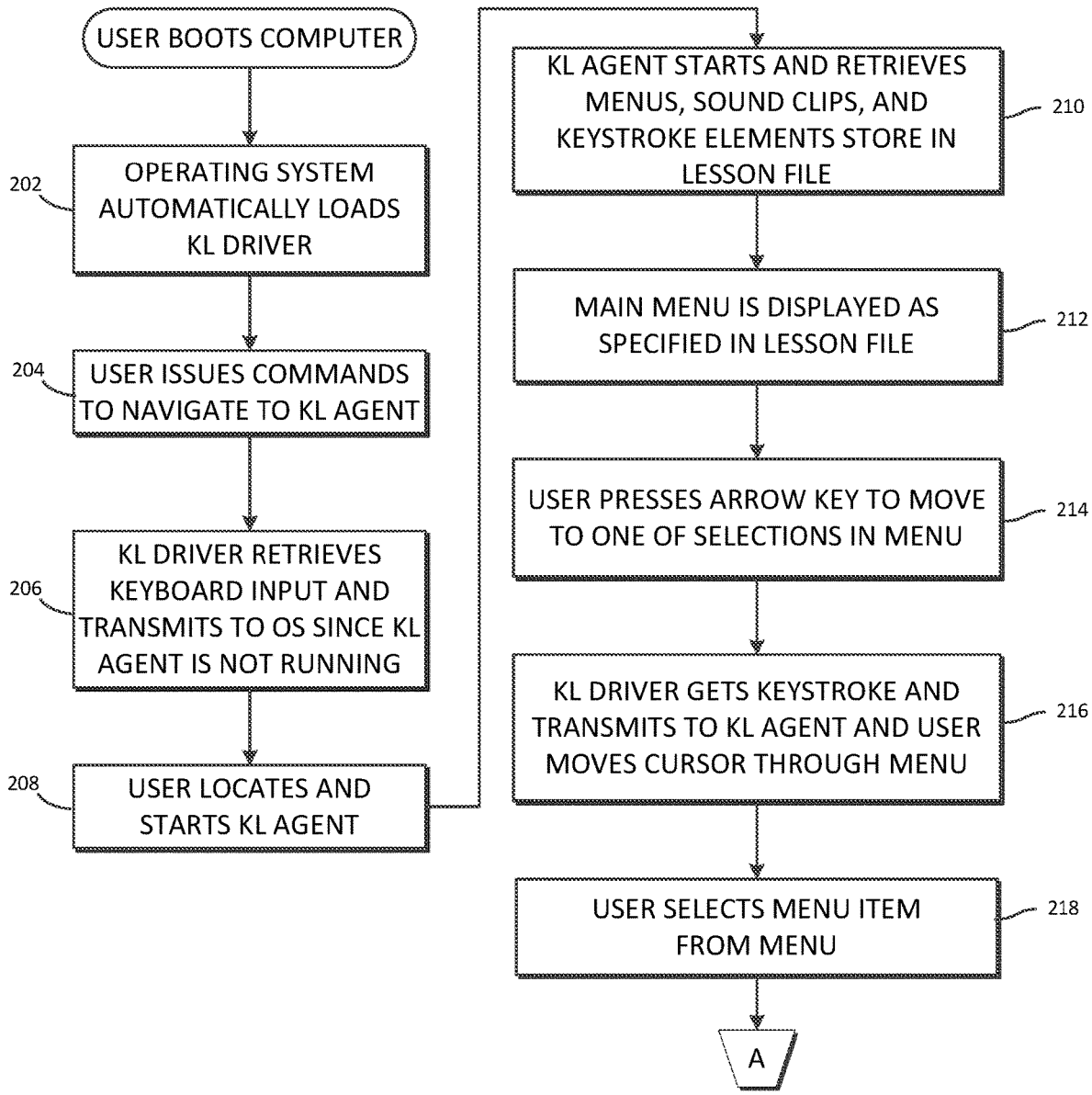
FIGS. 2A-2C illustrate a simplified flowchart of at least one embodiment of a method for using Keyboard Library Courseware (KL Courseware) that may be executed by the computer aided instruction system of FIG. 1.
Figure 2B:
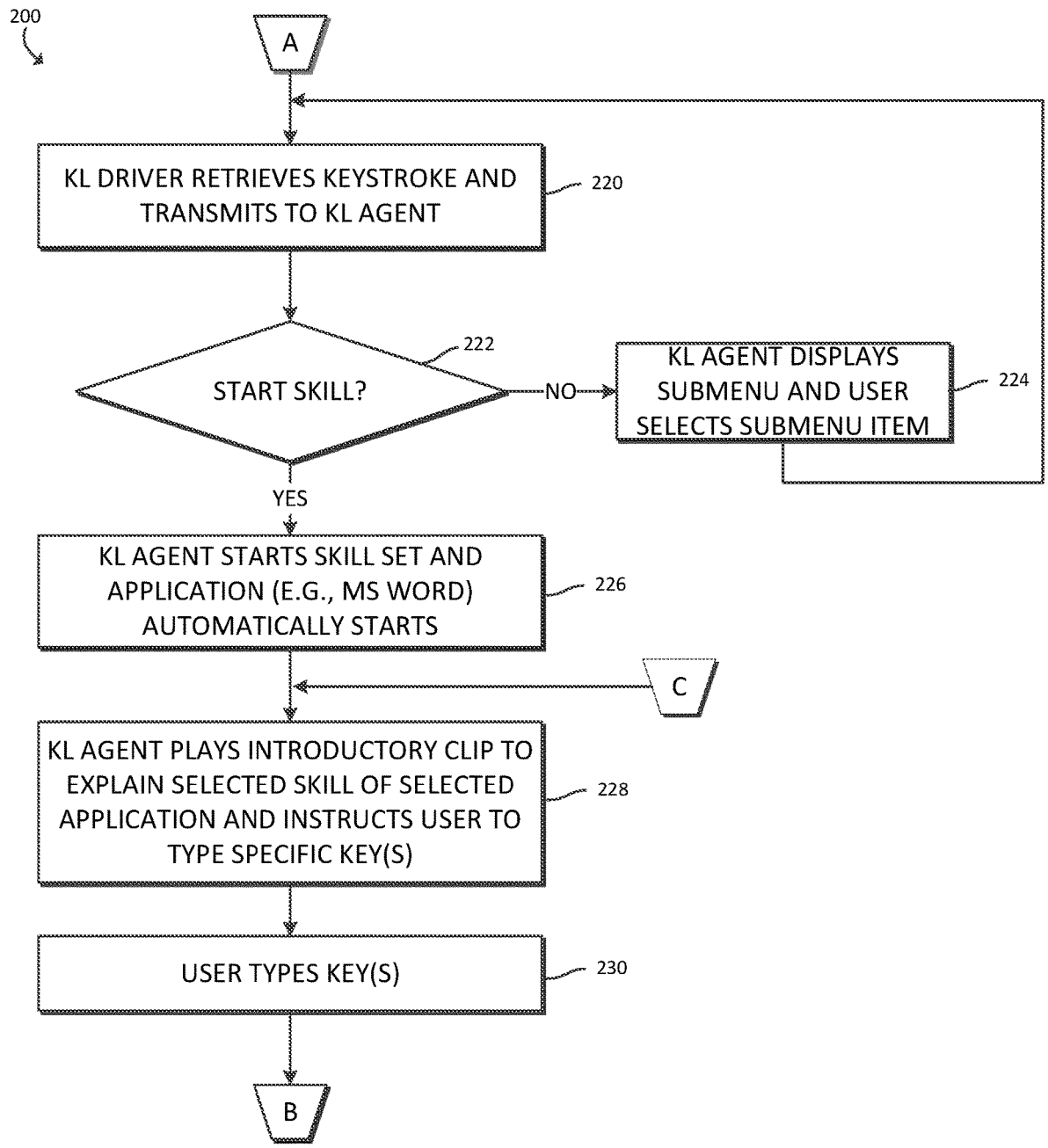
Figure 2C:
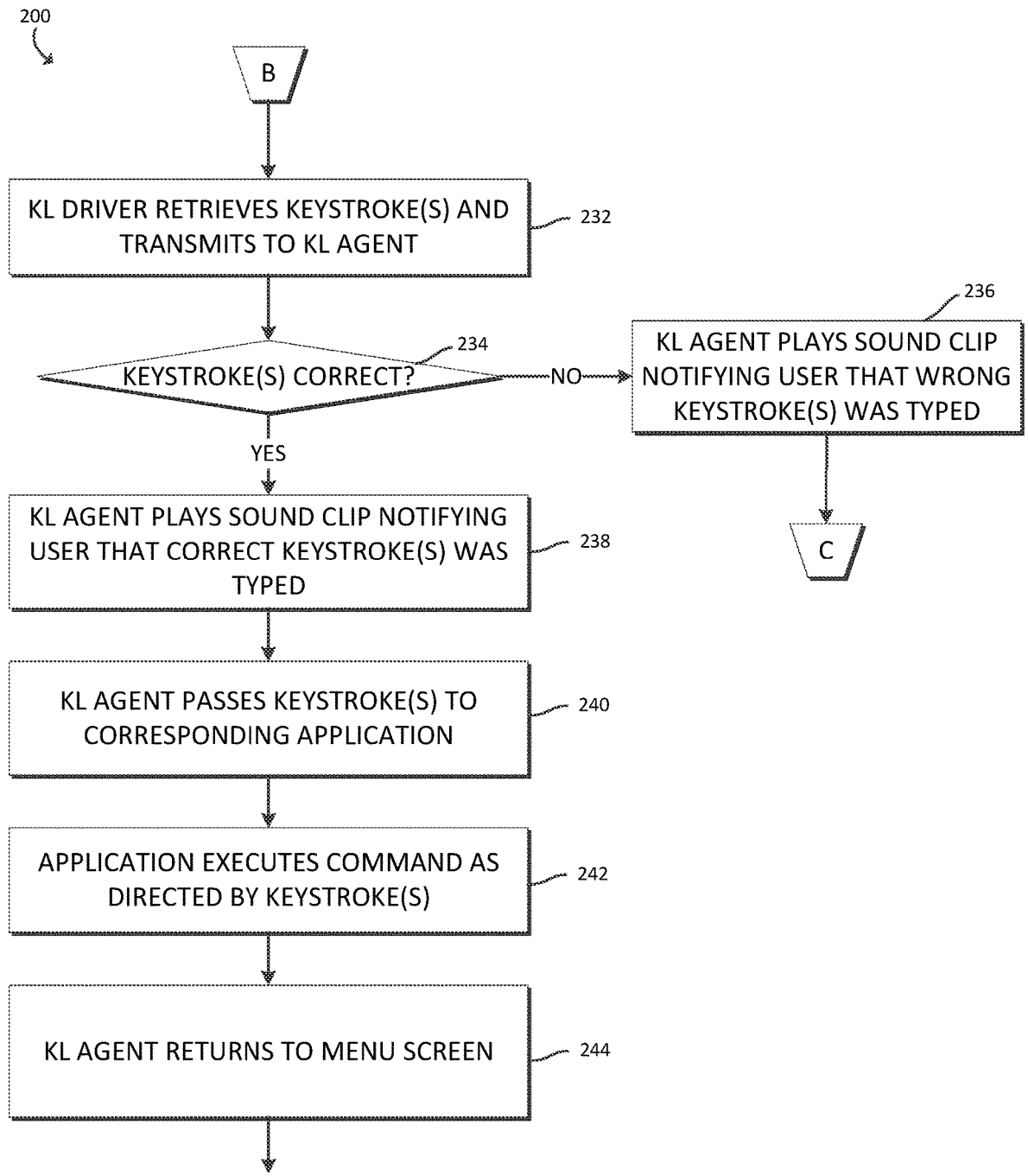

Referring now to FIGS. 2A-C, an exemplary operation method 200 of the computer aided instruction system 10 is shown. As shown in FIG. 2A, upon reboot of the computing device 12, the operating system (OS) automatically loads KL Driver as indicated in block 202. Subsequently, a user starts KL Courseware by locating and executing KL Courseware, as shown in blocks 204-208. In block 210, KL Agent starts and retrieves a lesson file. AS discussed above, the lesson file includes menu, sound clips, and keystroke elements. In block 212, the main menu is displayed as specified in the lesson file. The main menu includes folders, which includes a list of assistive technology and/or applications that the user can select from. For example, the assistive technology and/or applications may include Notepad, MS Word, MS Excel, MS Outlook, MS PowerPoint, or MS Internet Explorer. The user navigates and selects an assistive technology and/or applications that the user wishes to learn in blocks 214-218. In response to the user selection, KL Driver retrieves the keystroke of the user input and transmits to KL Agent as indicated in block 220 shown in FIG. 2B.

In block 222, KL Agent determines whether the retrieved keystroke (i.e., the selected menu item) is associated with a skill (e.g., a tutorial of a function or feature of the selected application) or requested access to a submenu. If KL Agent determines that the selected menu item is associated with a submenu, the method 200 proceeds to block 224 to display the submenu and receives a user selection of a submenu item. As discussed above, the submenu may include a list of functions or features of the selected application. When the submenu is selected, the method 200 loops back to block 220 for KL Driver to retrieve the keystroke and transmit to KL Agent.

Referring back to block 222, if KL Agent determines that the selected menu item is associated with the skill, the method 200 advances to block 226. In block 226, KL Agent starts the skill and executes an application that is associated with the skill. Subsequently, in block 228, KL Agent plays an introductory sound clip to explain the selected skill of the selected application and instructs the user to type a specific key or a key combination that is associated with the feature. In response, the user types a key or a key combination in block 230.

In block 232 shown in FIG. 2C, KL Driver retrieves all keystrokes that the user has entered and transmits to KL Agent. KL Agent determines whether the keystroke(s) entered by the user is correct in block 234. If the keystroke(s) is not correct, the method 200 proceeds to block 236, in which KL Agent plays a sound clip to notify the user that a wrong keystroke(s) was typed and loops back to block 228 to instruct the user to re-type the specific key or the key combination.

If the key or the key combination is correct, the method 200 advances to block 228, in which KL Agent plays a sound clip to notify the user that a correct keystroke(s) was typed. Subsequently, KL Agent transmits the keystroke(s) to the corresponding application that was launched in block 226. The application executes the command as directed by the keystroke(s) in block 242. Subsequently, in block 244, KL Agent returns to the last menu or submenu of KL Courseware that the user accessed the last to choose another skill to learn from KL Agent menus after a skill set is completed.

It should be appreciated that the main menu may be different amongst users depending on what is purchased by the user or customer. For example, the main menu may contain "JAWS for Windows," "MS Word," "MS Excel," and "MS Internet Explorer" for one customer and it may contain "ZoomText," "MS Outlook," and "MS PowerPoint" for another customer. Menus and submenus are used so that lessons may be organized into related topics. For example, MS Word lessons would include formatting procedures for how to underline, bold, and italicize text. These skills would fall under a submenu named "How to format" which would fall under the "MS Word" choice on the main menu. A lesson may include any number of menus, submenus, and skill sets. FIGS. 2A-2C illustrates how KL Driver and KL Agent interact with the user.

Referring now to FIGS. 3A-5C, exemplary methods 300, 400, 500 of operating the computer aided instruction system 10 are shown. Each method includes an example of KL Courseware skill set. Referring now to FIGS. 3A-3E, method 300 illustrates how to use a command for the JAWS for Windows assistive technology program. JAWS generally has many commands that are issued from a computer keyboard. One of the commands (e.g., a key or a key combination) is for speaking a line of texts that contains a cursor. For example, in the illustrated method 300, that command is performed by holding down a numpad insert key and tapping numpad up arrow key. KL Agent starts this skill set by explaining what the command does and what key combination should be issued to invoke it. After the user issues a key or a key combination, KL Agent evaluates each and every keystrokes and plays a sound clip to notify the user whether the user input was issued correctly. After the user types the key combination correctly, KL Agent transmits the keystrokes to an underlying program that is associated with the command. In this example, JAWS for Windows will perform the command to speak the line containing the cursor. If the user types a wrong key combination, KL Agent will notify the user that the user input is incorrect and prompts the user to try again. The following are the steps which the user will follow to learn this skill.

The user starts KL Agent by executing KLAgent.exe in blocks 302-308. In response, the main menu is displayed on a computer screen as indicated in block 310. The user presses one or more arrow keys "JAWS for Windows" in block 312. KL Driver obtains the keystroke in block 314 and transmits to KL Agent to determine which key was pressed. The screen reader reads aloud the folder names as the user moves through using the arrow keys. After the user selects "JAWS for Windows" in block 316, KL Driver obtains the keystroke in block 318 and transmits to KL Agent to determine which key was pressed. As shown in block 320-328 in FIG. 3B, a submenu associated with "JAWS for Windows" is displayed and is read aloud by the screen reader, for learning how to use the JAWS program.

Figure 3A:
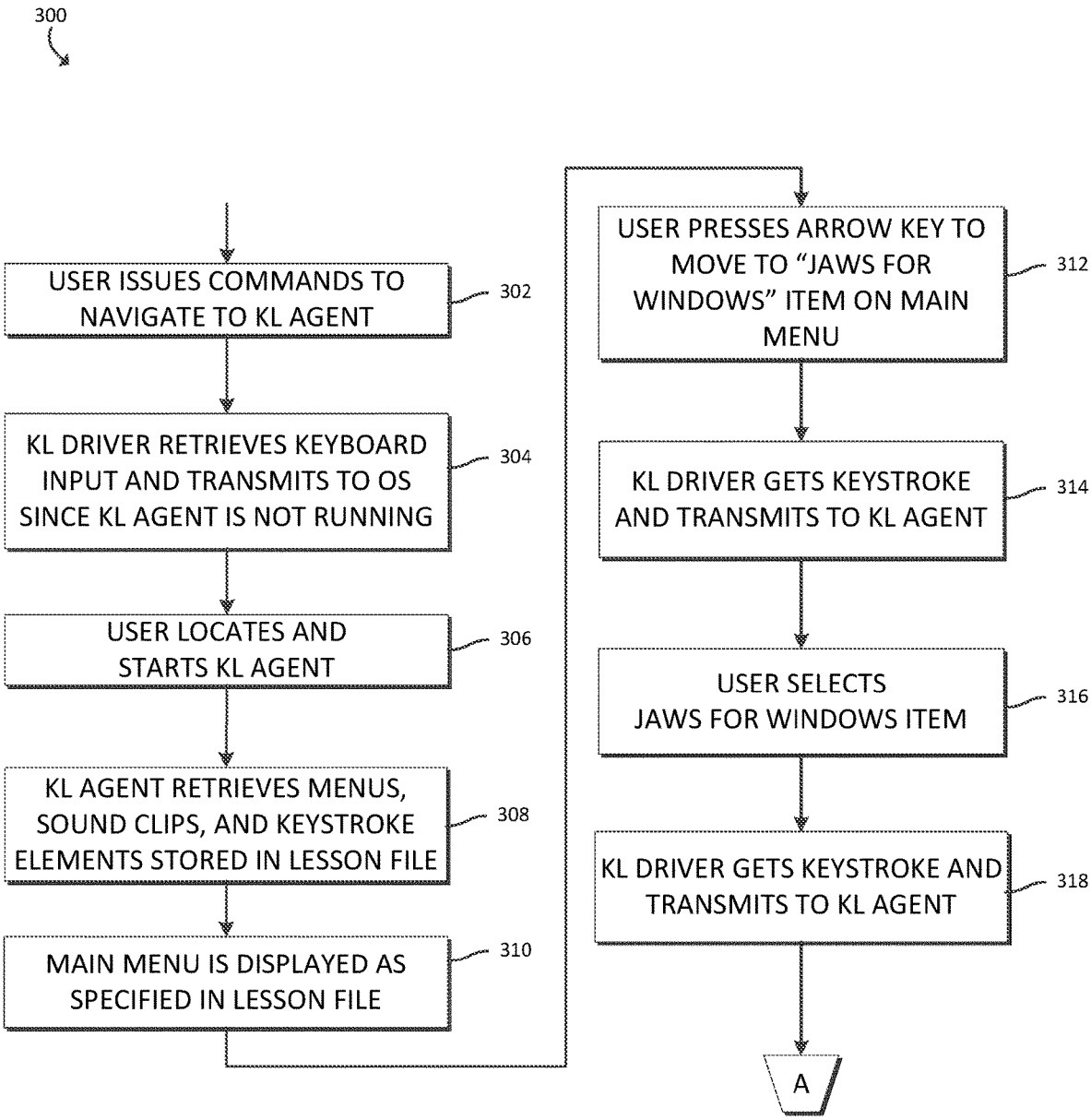
FIGS. 3A-3E illustrate a simplified flowchart of a first exemplary skill of KL Courseware that may be executed by the computer aided instruction system of FIG. 1.
Figure 3B:
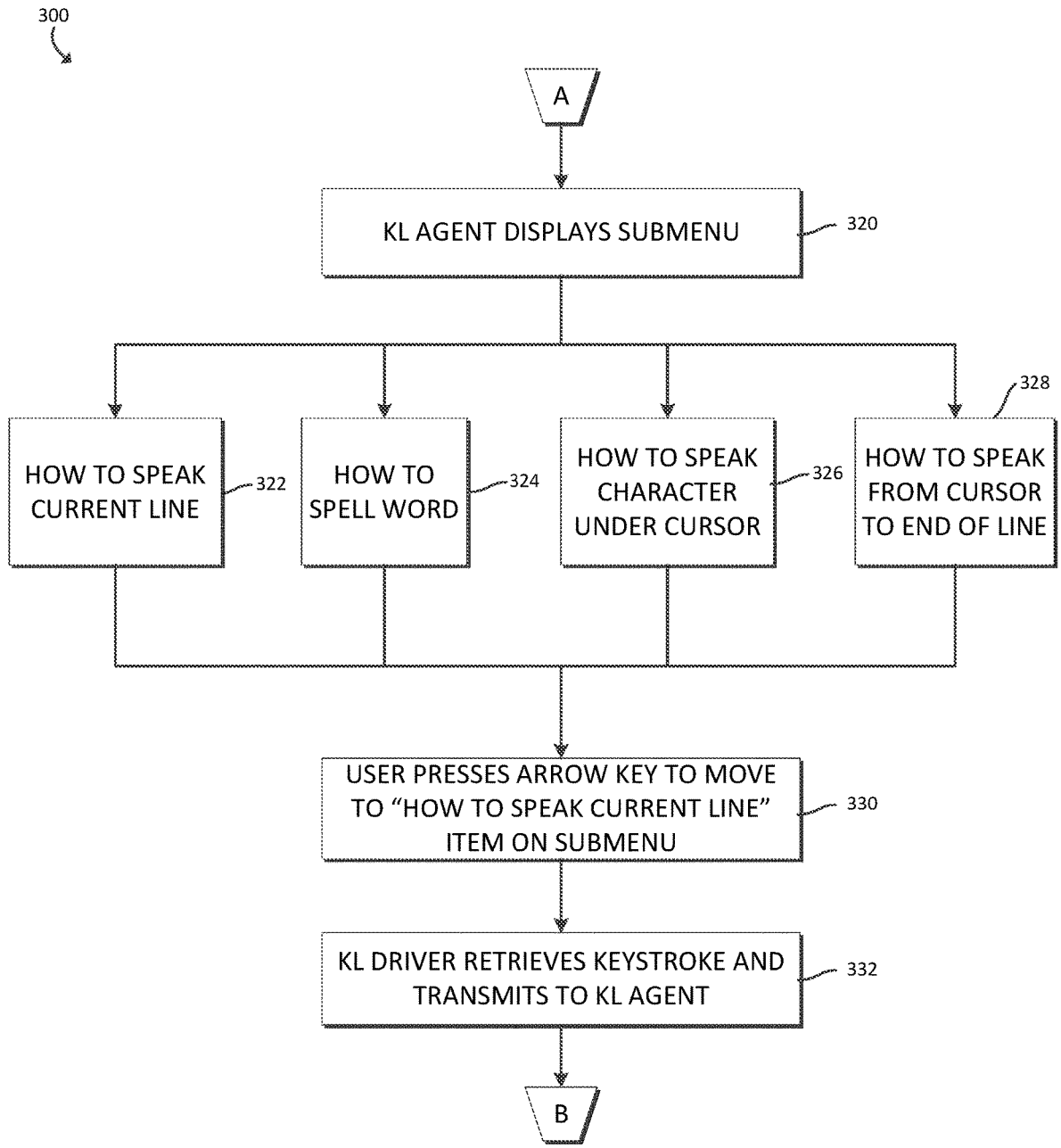
Figure 3C:
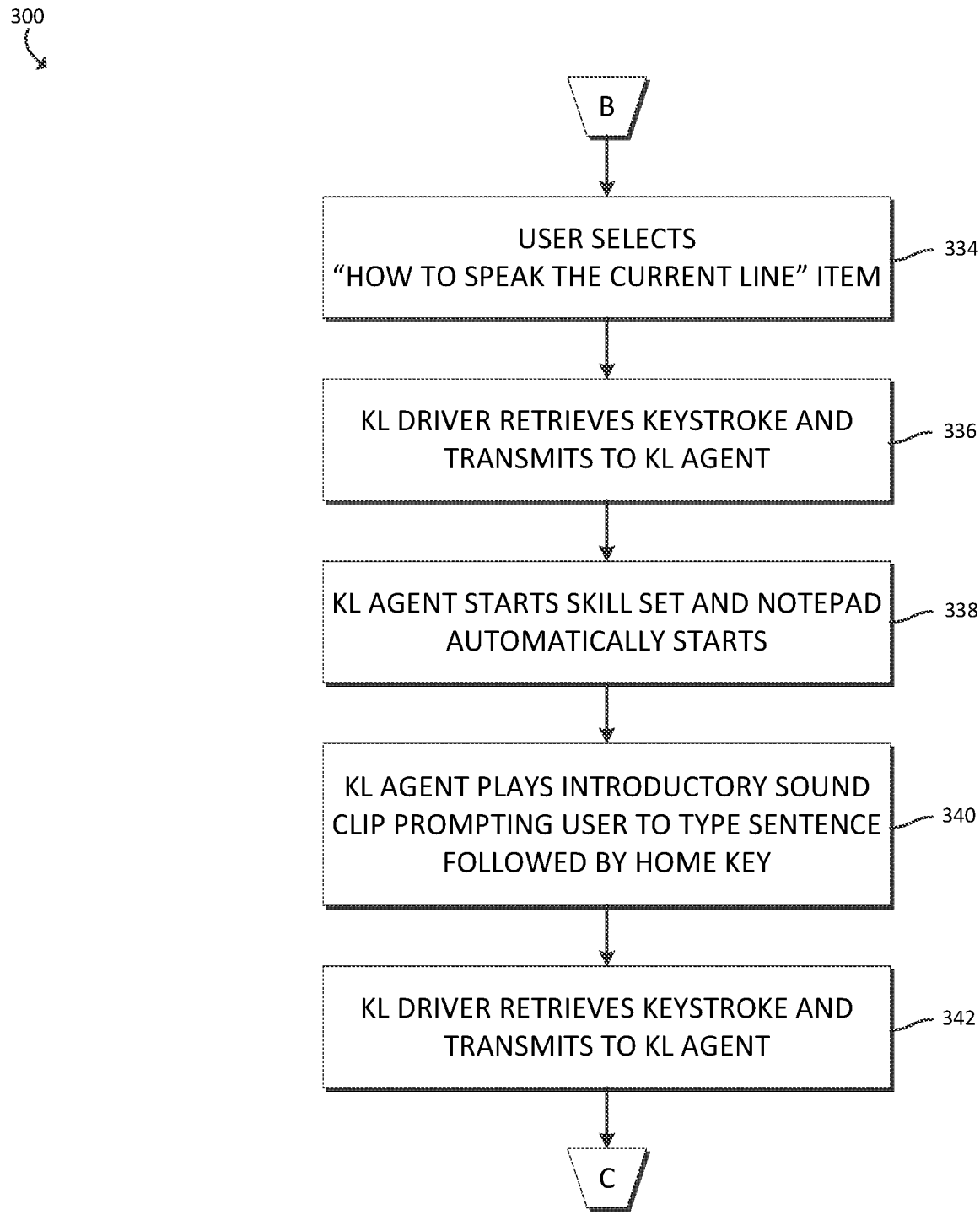
Figure 3D:
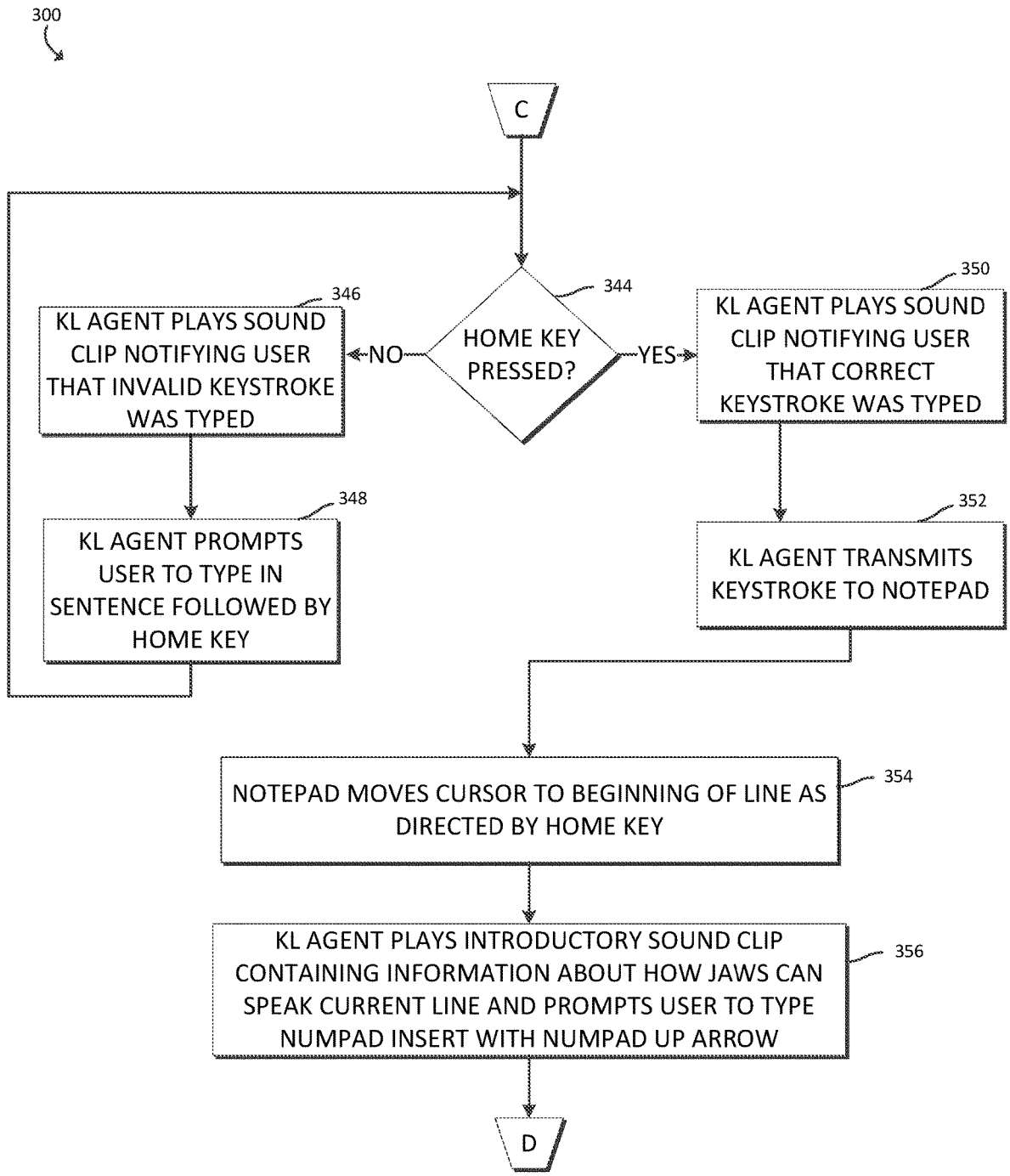
Figure 3E:
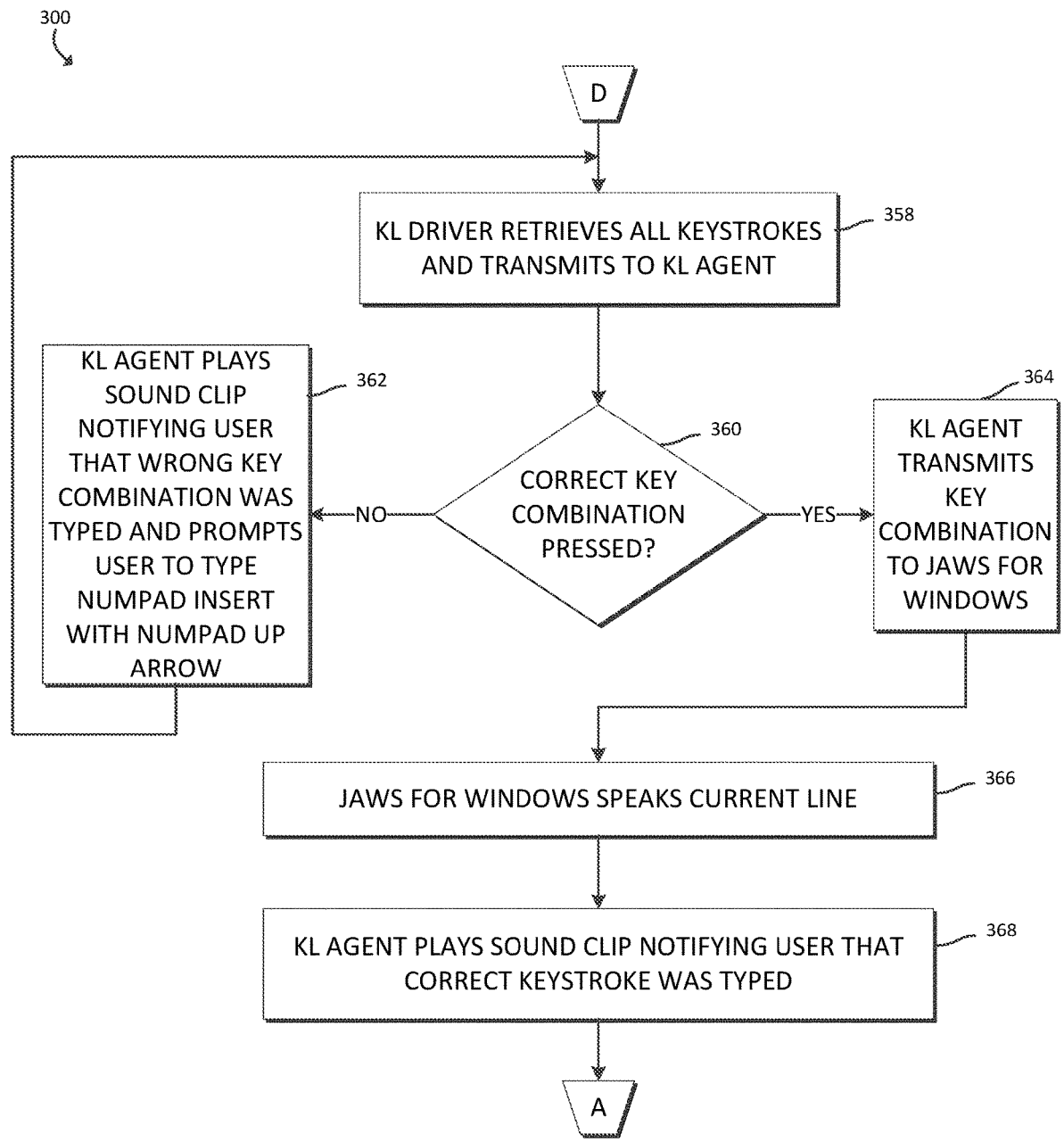

As shown in block 322 in FIG. 3C, the submenu includes a feature "How to speak the current line." When the user selects "How to speak the current line," Notepad starts, and KL Agent plays a human recorded sound clip that includes the following text: "Type the following: The quick brown fox jumped over the lazy dog and press the home key when you are finished." KL Agent will wait for the user to type the text. KL Driver retrieves all keys as the user types them and transmits to KL Agent. As shown in FIG. 3D, KL Agent evaluates all keystrokes to check if the home key was pressed. If anything other than alphanumeric, punctuation, or the home key is pressed, KL Agent plays a human recorded sound clip that includes the following text: "That was an invalid key. Type the following: The quick brown fox jumped over the lazy dog and press the home key when you are finished."

If the home key is pressed, KL Agent plays a human recorded sound clip that includes the following text: "Now let's learn a JAWS command for speaking the line which contains the cursor. Hold down the insert key on the numpad and tap the up arrow key on the numpad to speak the current line." If the user presses the correct key combination (numpad insert and numpad up arrow key), KL Agent transmits the key to the JAWS for Windows program and JAWS will speak the following: "The quick brown fox jumped over the lazy dog." Subsequently, KL Agent plays a human recorded sound clip that includes the following text: "Good job! Use this key combination whenever you want JAWS to speak the text on the line which contains the cursor." Additionally, KL Agent plays a human recorded sound clip that includes the following text if any other key or key combination is pressed other than a combination of the numpad insert and numpad up arrow keys: "Please try again. The insert key is the third key in from the right on the bottom row of the keyboard. The up arrow key is above the center key on the numpad. The center key is marked with a dot or ridge to help locate it quickly. Now hold down the numpad insert key and tap the numpad up arrow key to speak the line which contains the cursor." After the sound clip is played, the user types a key combination. Depending on whether the user pressed the correct key combination, KL Agent plays either "Good job!" or "Please try again." KL Agent will continue to repeat blocks 358-362 until the numpad insert key and the numpad up arrow key are pressed. Subsequently, the method 300 loops back to block 320 to display the submenu. Alternatively, in some embodiments, the method 300 may loop back to block 310 to display the main menu.

Referring now to FIGS. 4A-4G, method 400 illustrates how to underline text in MS Word. MS Word generally has many commands that are issued from the computer keyboard. One of the commands (e.g., a key or a key combination) is for formatting a document. For example, in the illustrated method 400, the command for underlining text is performed by holding down control and tapping the letter U. KL Agent starts this skill set by explaining what the command does and prompts the user to press the key combination to perform the task. KL Driver retrieves all the keystrokes and transmits to KL Agent. After the user issues a key combination, KL Agent evaluates the keystrokes and plays a sound clip to notify the user whether the command was issued correctly. In response to receiving a correct key combination, KL Agent transmits the keystrokes on to MS Word and MS Word underlines the text. If, however, the user types the wrong key combination, KL Agent will notify the user and prompt the user to try again. In the illustrative method 400, JAWS for Windows is running while performing the skill set. However, it should be appreciated that, in some embodiments, JAWS does not have to be running. In another embodiment, other assistive technology programs like ZoomText, Windows Narrator, Magic, or other assistive technology programs may be running in place of JAWS. The following are the steps which the user will follow for learning this skill.

Figure 4A:
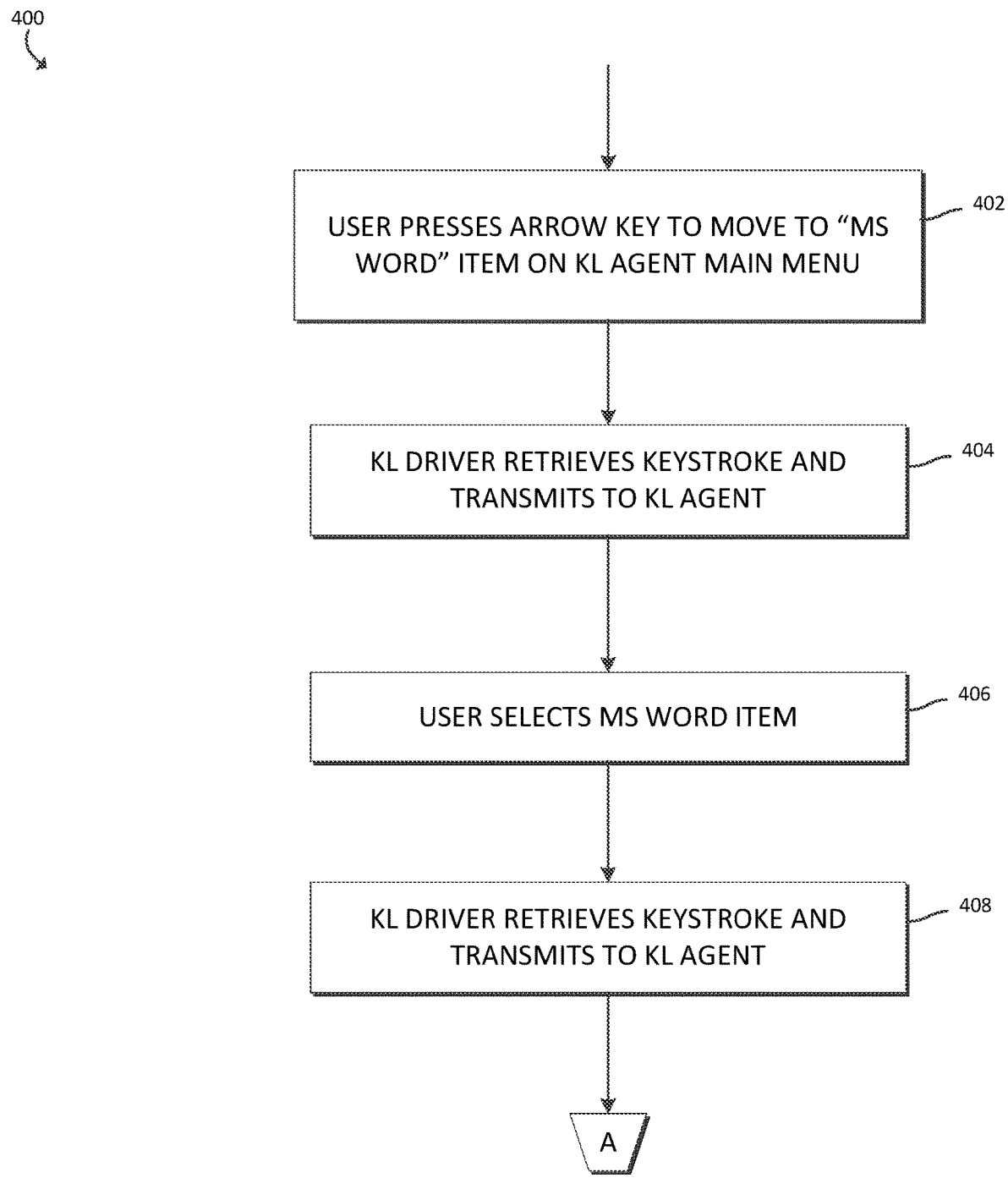
FIGS. 4A-4G illustrate a simplified flowchart of a second exemplary skill of KL Courseware that may be executed by the computer aided instruction system of FIG. 1.
Figure 4B:
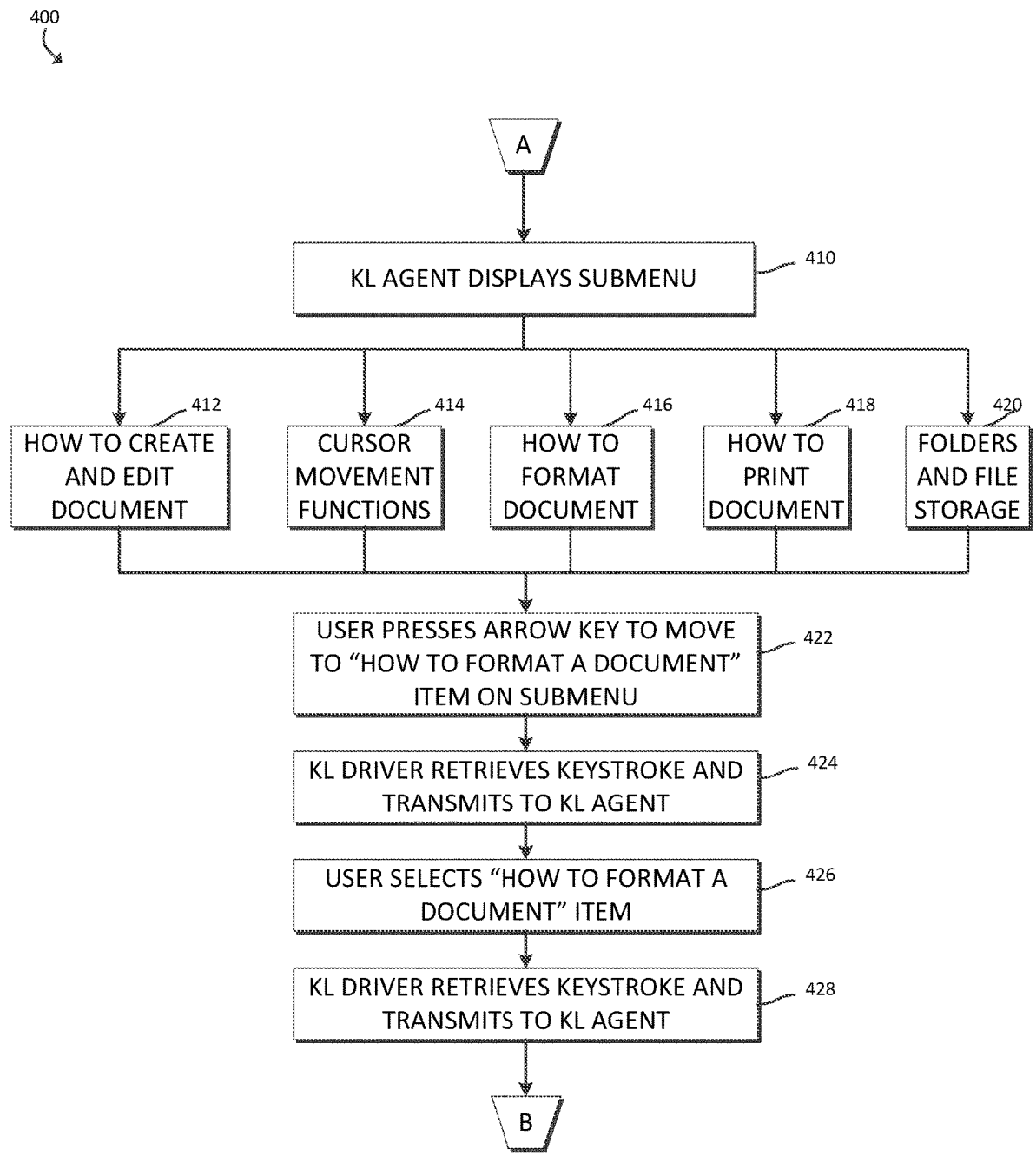
Figure 4C:
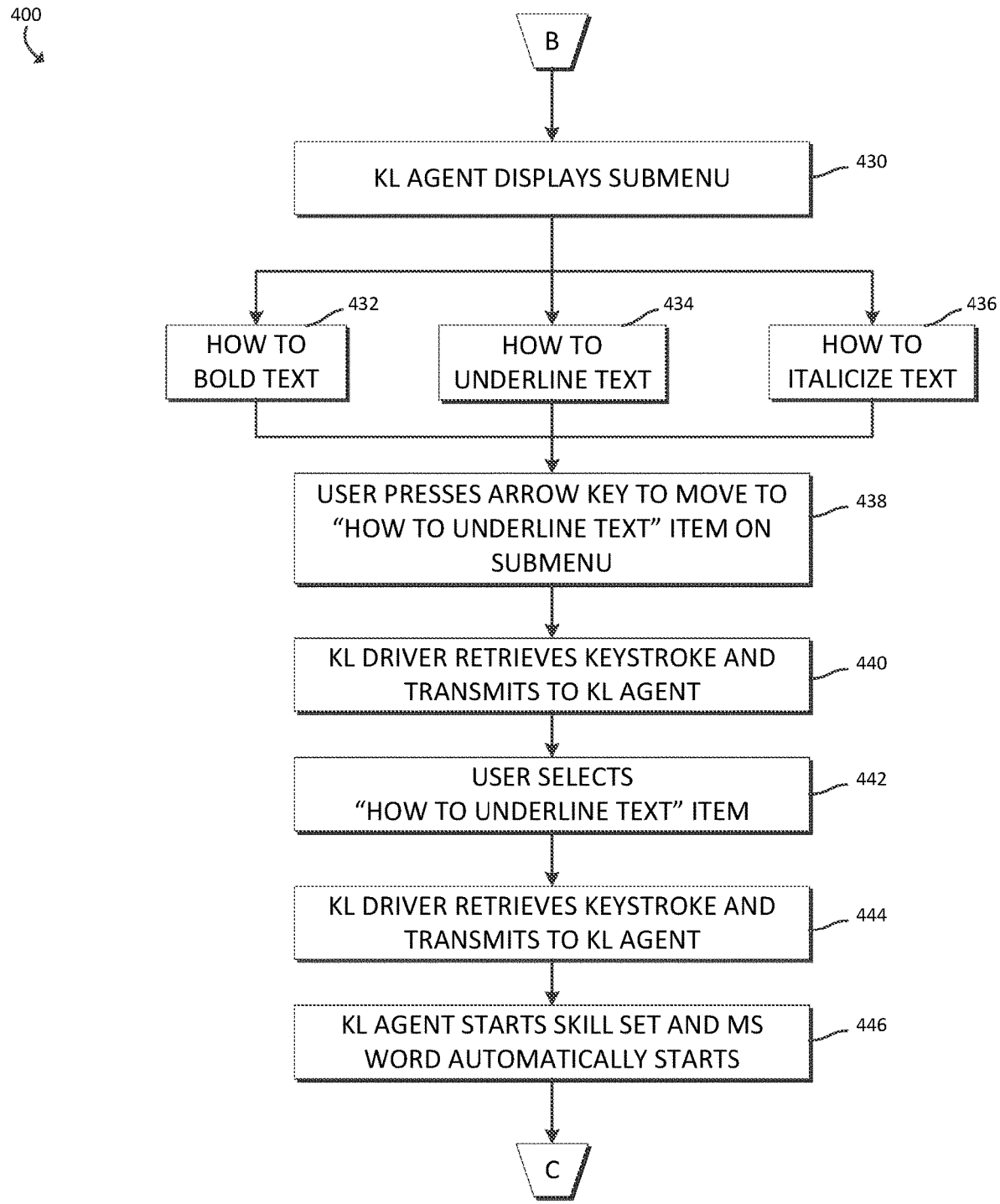

In block 402, the user moves the arrow key to select "MS Word" on KL Agent main menu. Once "MS Word" is selected and transmitted to KL Agent, KL Agent displays a submenu on the computer monitor as shown in FIG. 4B. The submenu includes: How to create and edit a document; Cursor movement functions; How to format a document; How to print a document, and Folders and file storage. The user moves the arrow key and selects "How to format a document." As shown in FIG. 4C, the submenu "How to format a document" includes an item named "How to underline text". When the user selects this item, KL Agent automatically starts MS Word and KL Agent plays a human recorded sound clip that includes the following text: "Type the following: Now is the time for all good men to come to the aid of their country and press the home key when you are finished."

Figure 4D:
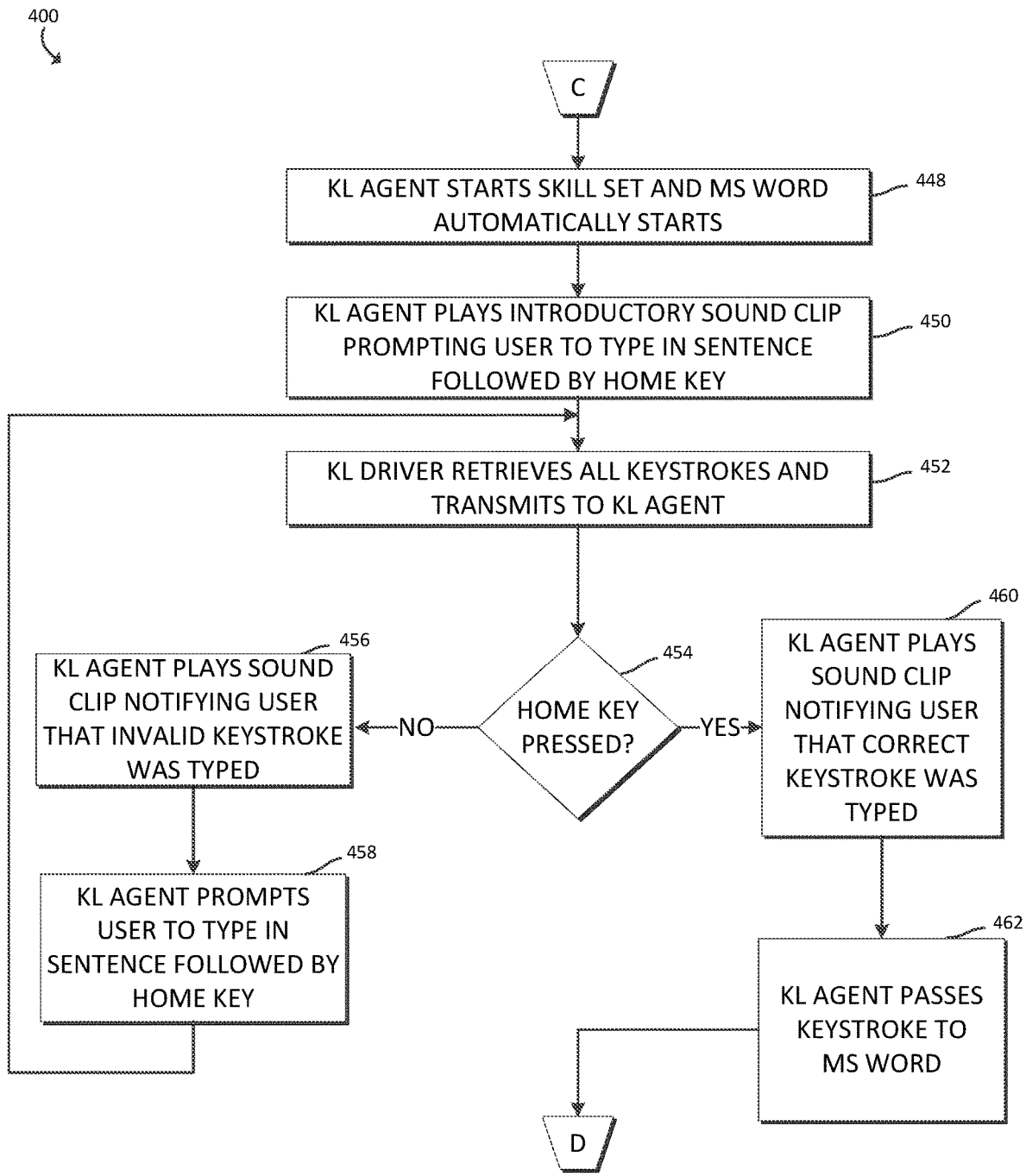

As shown in FIG. 4D, KL Agent waits for the user to type the text. KL Driver retrieves all keys as the user types them and transmits to KL Agent. KL Agent will evaluate all keystrokes to check if the home key was pressed. If anything other than alphanumeric, punctuation, or the home key is pressed, KL Agent plays a human recorded sound clip that includes the following text: "That was an invalid key. Type the following: Now is the time for all good men to come to the aid of their country and press the home key when you are finished." When the home key is pressed, KL Agent plays a human recorded sound clip that includes the following text: "Now hold down the control key and tap the right arrow key to move the cursor to the next word."

Figure 4E:
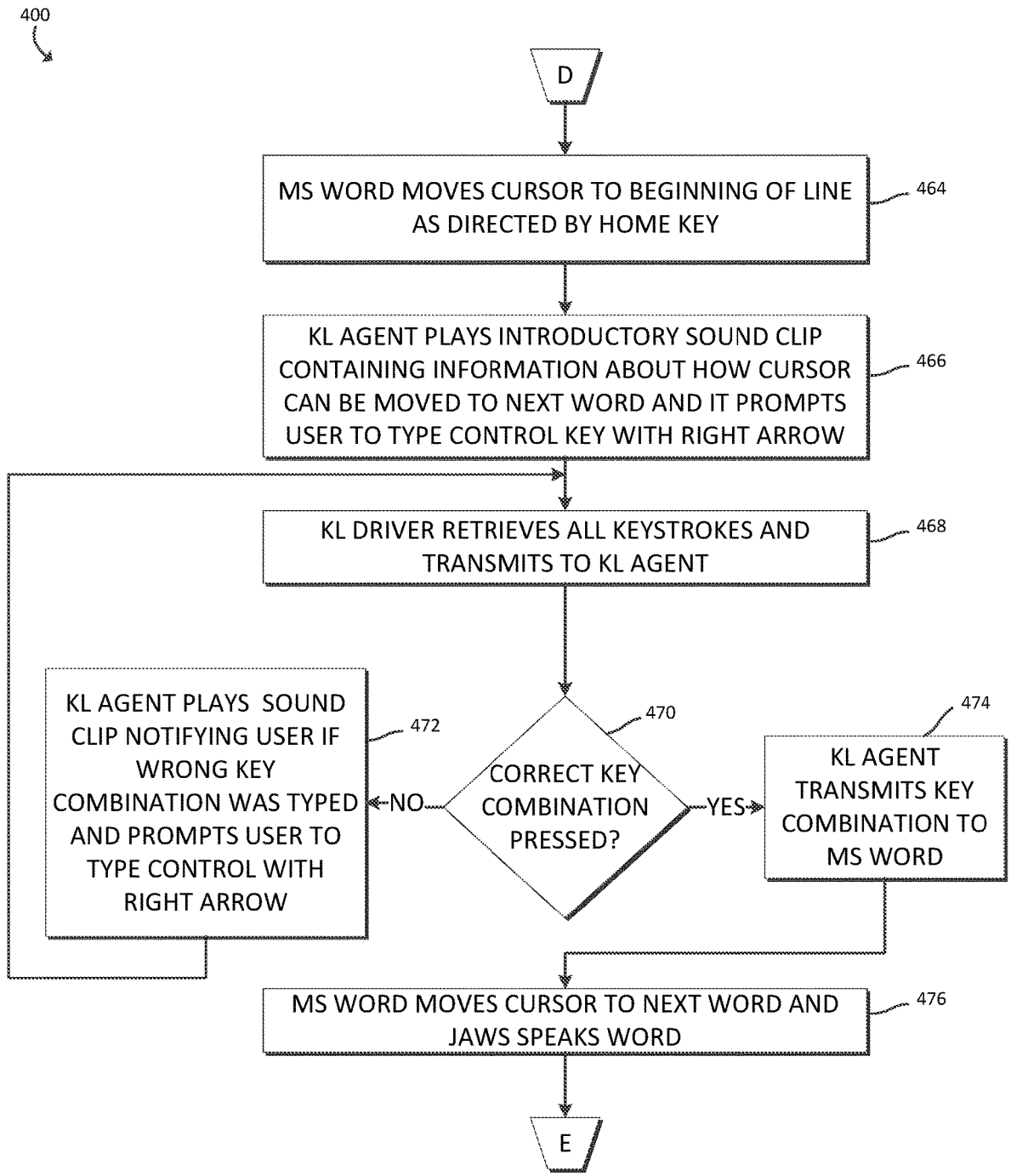
Figure 4F:
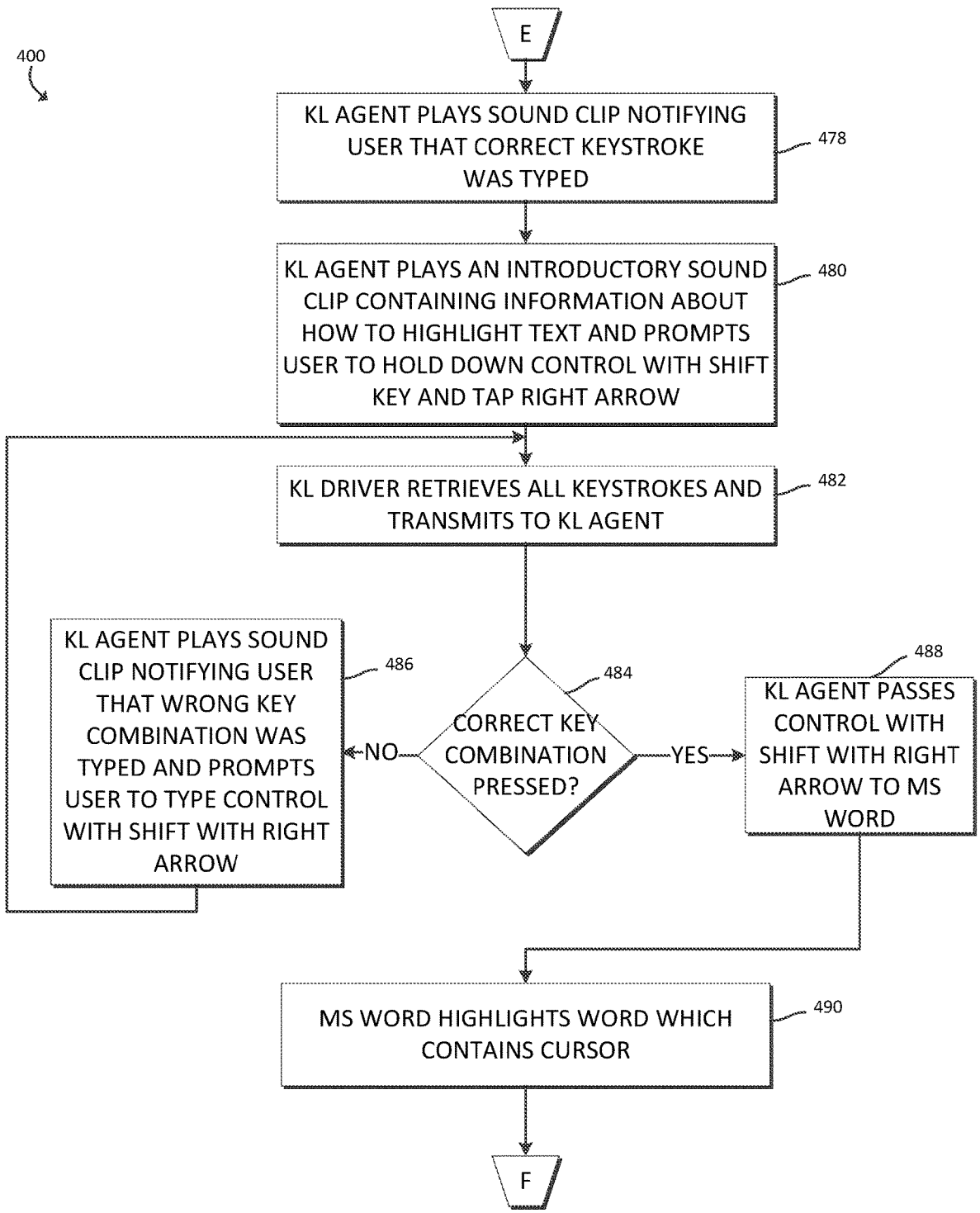

As shown in FIG. 4E, if any other key or key combination is pressed other than control with the right arrow key, KL Agent plays a human recorded sound clip that includes the following text: "Please try again. The control key is the first key to the far left on the bottom row of the keyboard. The right arrow key is the fourth key from the right on the bottom row of the keyboard. Now hold down the control key and tap the right arrow key to move the cursor to the next word." The sound clip is repeated until the correct key combination is pressed.

If the user presses the correct key combination (i.e., the control key with the right arrow key), JAWS for Windows will speak the following: "quick." Subsequently, as shown in FIG. 3F, KL Agent plays a human recorded sound clip that includes the following text: "Good job! Use this key combination whenever you want to move the cursor to the next word. Now let's learn how to highlight the current word. Hold down the control with the shift key and tap the right arrow key to select and highlight the word which contains the cursor." Additionally, KL Agent plays a human recorded sound clip that includes the following text if any other key or key combination is pressed other than the control key, the shift key, and the right arrow key: "Please try again. The control key is the first key to the far left on the bottom row of the keyboard. The shift key is above the control key. The right arrow key is the fourth key from the right on the bottom row of the keyboard. Now hold down the control key with the shift key and tap the right arrow key to select and highlight the word which contains the cursor." The sound clip is repeated until the correct key combination is pressed.

Figure 4G:
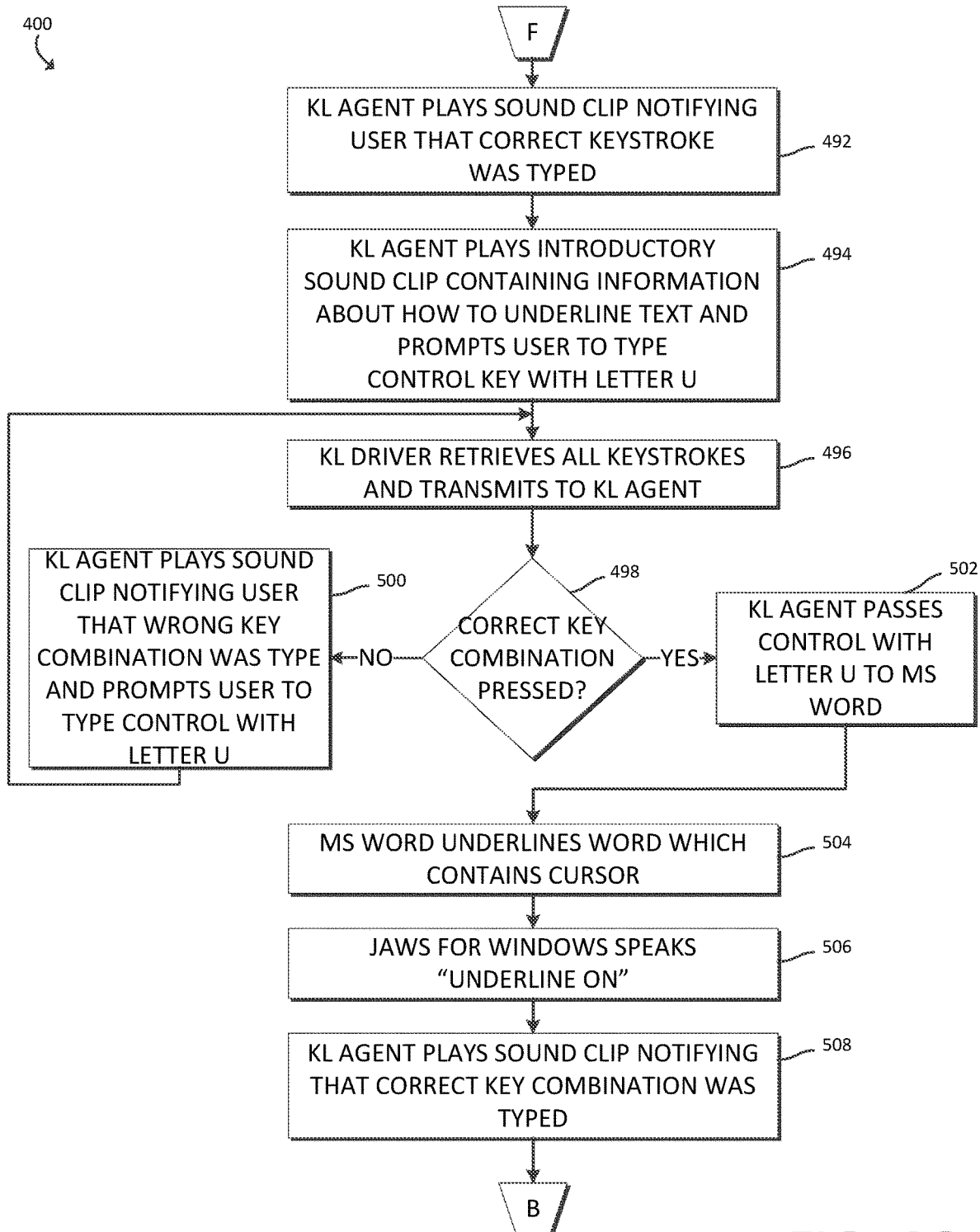

As shown in FIG. 4G, if the user presses the correct key combination (i.e., the control key, the shift key, and the right arrow key), JAWS for Windows will speak the following: "quick selected." Subsequently, KL Agent plays a human recorded sound clip that includes the following text: "Good job! Use this key combination whenever you want to select the word which contains the cursor. Now let's learn how to underline the selected word. Hold down the control key and tap the letter U to underline the highlighted word." KL Agent further plays a human recorded sound clip that includes the following text if any other key or key combination is pressed other than control with the letter U: "Please try again. The control key is the first key to the far left on the bottom row of the keyboard. Now hold down the control key and tap the letter U to underline the highlighted text." The sound clip is repeated until the correct key combination is pressed. If the user presses the correct key combination (i.e., the control key with the letter U), JAWS for Windows will speak the following: "underline on," and KL Agent plays a human recorded sound clip that includes the following text: "Good job! Use this key combination whenever you want to underline text." Subsequently, the method 400 loops back to block 430 to display the submenu. Alternatively, in some embodiments, the method 400 may loop back to block 410 to display the higher-level submenu or to block 402 to display the main menu.

Figure 5A:
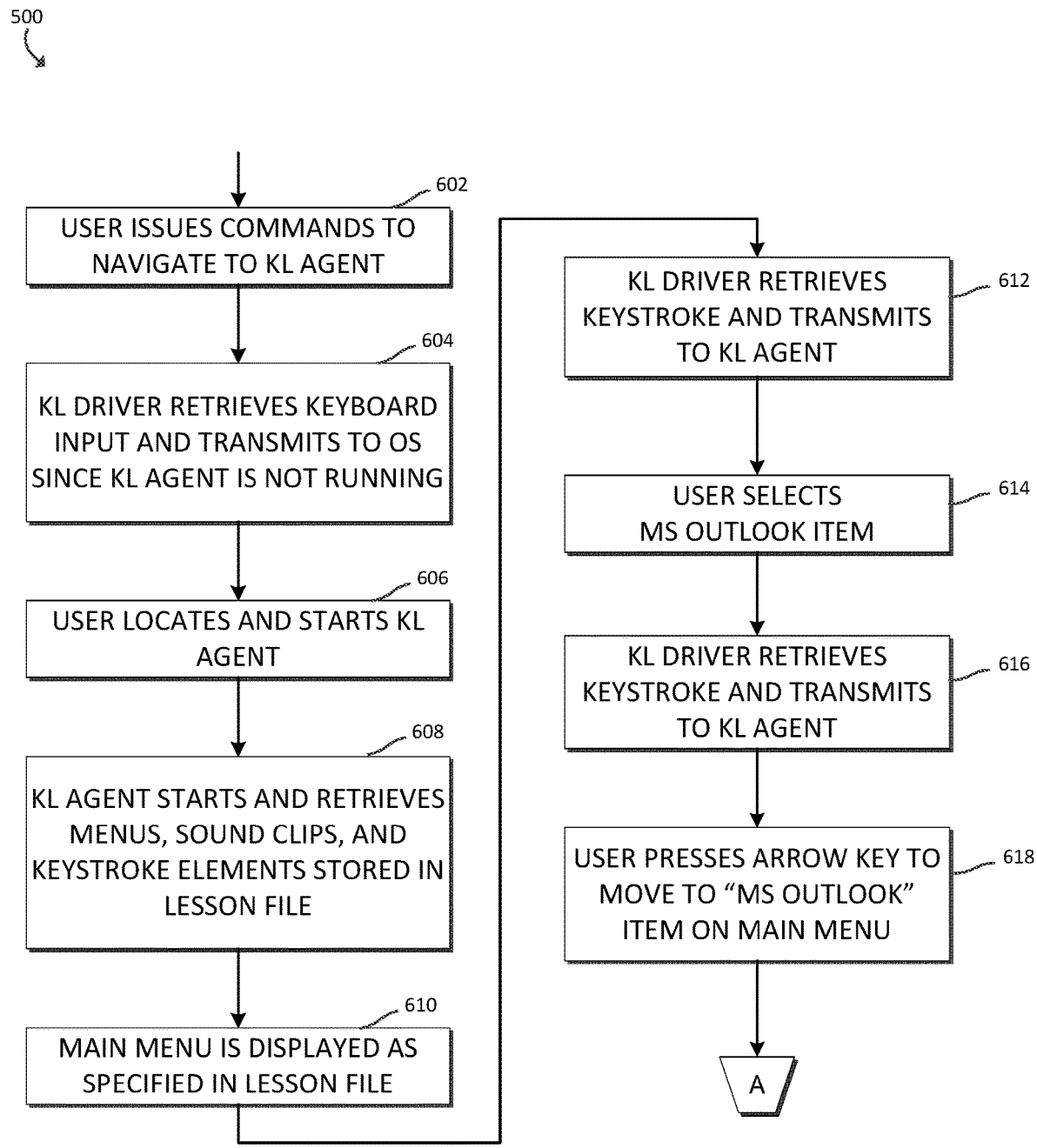
FIGS. 5A-5C illustrate a simplified flowchart of a third exemplary skill of KL Courseware that may be executed by the computer aided instruction system of FIG. 1.
Figure 5B:
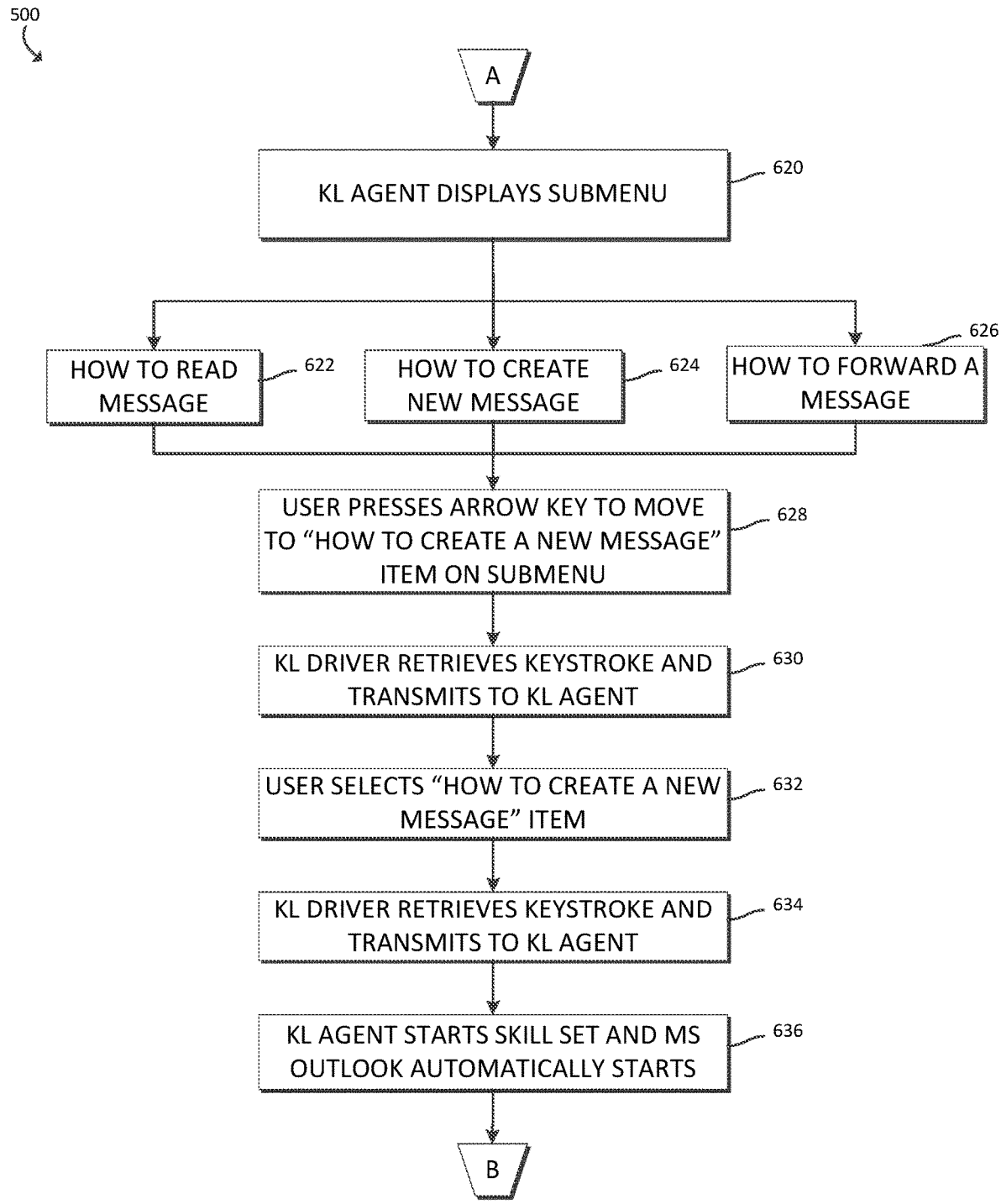
Figure 5C:
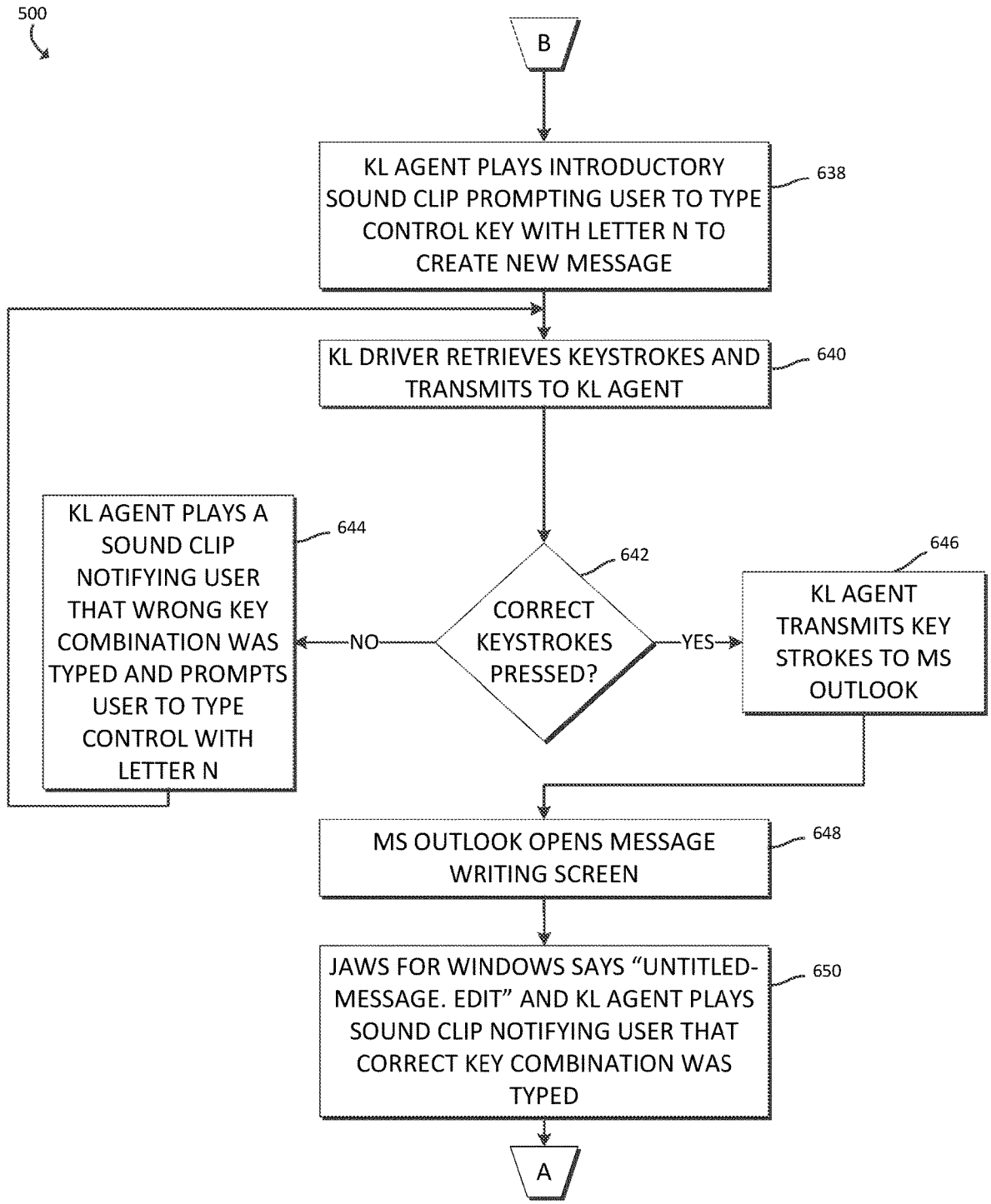

Referring now to FIGS. 5A-5C, method 500 illustrates how to create a new message in MS Outlook. MS Outlook generally has many commands that are issued from the computer keyboard. One of the commands (e.g., a key or a key combination) is for creating a new message. For example, in the illustrated method 500, the command for creating a new message is performed by holding down control and tapping the letter N. KL Agent starts this skill set by explaining what the command does and prompts the user to type the key combination for performing the task. KL Driver retrieves all keystrokes and transmits to KL Agent. After the user issues a key combination, KL Agent evaluates the keystrokes and plays a sound clip to notify the user whether the command was issued correctly. In response to receiving the correct key combination, KL Agent transmits the keystrokes to the Outlook program and the Outlook program opens the screen for composing a message. If the user types the wrong key combination, KL Agent will notify the user and prompts the user to try again. In the illustrative method 500, JAWS for Windows is running while performing the skill set. In another embodiment, other assistive technology programs like ZoomText, Windows Narrator, Magic, or other assistive technology programs may be running in place of JAWS. The following are the steps which the user will follow for learning this skill.

In blocks 602-606, the user starts KL Agent and the main menu is displayed. The user uses the arrow keys to move to and presses enter on "MS Outlook." In response, a submenu including several items for learning how to use MS Outlook is displayed. As shown in FIG. 5B, the submenu includes an item named "How to create a new message." When the item is selected, KL Agent automatically starts MS Outlook in block 636 and plays a human recorded sound clip that includes the following text in block 638: "Hold down the control key and tap the letter N to open the dialog for composing a new message." KL Agent further plays a human recorded sound clip that includes the following text if any other key or key combination is pressed other than control with the letter N: "Please try again. The control key is the first key to the far left on the bottom row of the keyboard. Now hold down the control key and tap the letter N to open the screen for composing a new message." The sound clip is repeated until the correct key combination is pressed. If the user presses the correct key combination (i.e., the control key with the letter N), JAWS for Windows will speak the following: "untitled-message. edit" and KL Agent plays a human recorded sound clip that includes the following text: "Good job! Use this key combination whenever you want to open the dialog for composing a new message." Subsequently, the method 500 loops back to block 620 to display the submenu. Alternatively, in some embodiments, the method 500 may loop back to block 610 to display the main menu.

KL Courseware includes a testing feature so that the user can monitor the user's progress. In the illustrative embodiment, test questions include two human-recorded sound clips. One prompts the user to type a key combination associated with a software function. The other includes a response to notify the user whether the correct key combination was typed. For example, if a test question asks the user to type a key combination for opening a dialog edit box for retrieving a file in Microsoft Word. After the user types a command (i.e., a key or a key combination), a second human-recorded sound clip is played, which notifies the user whether the command was correct or wrong. There are several tests, and each test covers a related topic. For example, the tests may include cursor movement functions, editing, formatting, file management, and printing categories for Microsoft Word. Each test contains several questions. A human recorded sound clip is played at the end of the test, which notifies the user of a test result (e.g., a percentage of correct answers). The name of the test, the score, and the test date are stored in a database for every test the user takes so that the user can monitor the user's progress. The test result may be shared with a parent, a counselor, a teacher, or other interested party. For example, KL Courseware may email an interested party the test result including a name of the user (i.e., the test taker), a name of the test section(s), a name of the test item(s), a list of correct and incorrect item(s), and a cumulative score.

While the disclosure has been illustrated and described in detail in the drawings and foregoing description, such an illustration and description is to be considered as exemplary and not restrictive in character, it being understood that only illustrative embodiments have been illustrated and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A computer aided instruction system comprising:
   a processor;
   a keyboard driver configured to retrieve a keyboard input from a user before an application receives the keyboard input, and
   an instruction renderer configured to execute a computer aided instruction tutorial to instruct the user to input a specific key or key combination,
   wherein the keyboard driver is configured to transmit the keyboard input to the instruction renderer to determine whether one or more keystrokes matches the specific key or key combination,
   wherein the instruction renderer is configured to:
      pass the one or more keystrokes to the application in response to a determination that the one or more keystrokes matches the specific key or key combination; and
      not pass the one or more keystrokes to the application in response to a determination that the one or more keystrokes do not match the specific key or key combination.

2. The computer aided instruction system of claim 1, further comprising a tutorial editor configured to create one or more computer aided instruction tutorials.

3. The computer aided instruction system of claim 1, wherein the application is an assistive technology.

4. The computer aided instruction system of claim 1, wherein the instruction renderer is configured to transmit the keyboard input to the application.

5. The computer aided instruction system of claim 1, wherein the instruction renderer is further configured to provide feedback to the user based on whether the one or more keystrokes matches the specific key or key combination.

6. One or more non-transitory machine-readable media comprising a plurality of instructions stored thereon that in response to being executed by a computer aided instruction system, causes the computer aided instruction system to:
   retrieve a keyboard input from a user before an application receives the input of the keyboard, wherein the keyboard input indicates a computer aided instruction tutorial,
   execute, in response to retrieving the keyboard input, the computer aided instruction tutorial to instruct the user to input a specific key or key combination,
   receive, in response to executing the computer aided instruction tutorial, one or more keystrokes from the user,
   determine, in response to receiving the one or more keystrokes, whether the one or more keystrokes matches the specific key or key combination,
   pass the one or more keystrokes to the application when the computer aided instruction system determines that the one or more keystrokes matches the specific key or key combination, and
   not pass the one or more keystrokes to the application when the computer aided instruction system determines that the one or more keystrokes do not match the specific key or key combination.

7. The one or more non-transitory machine-readable media of claim 6, wherein the application is an assistive technology.

8. The one or more non-transitory machine-readable media of claim 6, further comprising a plurality of instructions that in response to being executed cause the computer aided instruction system to transmit, in response to evaluating the one or more keystrokes, the keyboard input to the application.

9. A method for training a vision-impaired user to use a compute device, the method comprising:
   instructing, by an instruction renderer of the compute device, the vision-impaired user to input a first specific key or key combination;
   receiving, by a keyboard driver of the compute device, a first keyboard input from the vision-impaired user before an application receives the first keyboard input;
   determining, by the compute device, whether the first keyboard input from the vision-impaired user matches the first specific key or key combination;
   passing, by the compute device, the first keyboard input to the application in response to a determination that the first keyboard input matches the first specific key or key combination;
   instructing, by the instruction renderer, the vision-impaired user to input a second specific key or key combination;
   receiving, by the keyboard driver, a second keyboard input from the vision-impaired user before the application receives the second keyboard input;
   determining, by the compute device, whether the second keyboard input from the vision-impaired user matches the second specific key or key combination; and
   not passing, by the compute device, the second keyboard input to the application in response to a determination that the second keyboard input does not match the second specific key or key combination.

10. The method of claim 9, wherein receiving, by the keyboard driver, the second keyboard input from the vision-impaired user before the application receives the second keyboard input comprises receiving the second keyboard input while the application has focus, wherein not passing, by the compute device, the second keyboard input to the application comprises not passing the second keyboard input to the application while the application has focus.

11. The method of claim 10, wherein the application is unmodified commercial software.

* * * * *